United States Patent
Pathiyal

(10) Patent No.: US 11,303,756 B2
(45) Date of Patent: Apr. 12, 2022

(54) SYSTEM AND METHOD FOR AUTO-INITIATING CONFERENCE CALLS FROM A USER DEVICE

(71) Applicant: Visa International Service Association, San Francisco, CA (US)

(72) Inventor: Sanjay Pathiyal, Burlingame, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 210 days.

(21) Appl. No.: 16/512,185

(22) Filed: Jul. 15, 2019

(65) Prior Publication Data

US 2021/0021712 A1    Jan. 21, 2021

(51) Int. Cl.
| | | |
|---|---|---|
| *H04M 3/56* | (2006.01) | |
| *G10L 15/18* | (2013.01) | |
| *G06F 16/955* | (2019.01) | |
| *H04M 3/42* | (2006.01) | |

(52) U.S. Cl.
CPC ........ *H04M 3/565* (2013.01); *G06F 16/9554* (2019.01); *G10L 15/1822* (2013.01); *H04M 3/42382* (2013.01); *H04M 3/567* (2013.01)

(58) Field of Classification Search
CPC . H04W 4/06; H04M 3/563; H04M 2203/652; H04M 2203/5054; H04M 7/003; H04M 3/42382; H04M 3/567; H04L 12/1818; H04L 12/189; G10L 15/1822; G06F 16/9554

See application file for complete search history.

(56) References Cited

U.S. PATENT DOCUMENTS

| | | | | |
|---|---|---|---|---|
| 8,811,962 | B1* | 8/2014 | Smith | H04M 7/003 455/416 |
| 9,762,735 | B1* | 9/2017 | Webster | H04W 4/06 |
| 2012/0011216 | A1* | 1/2012 | Zuber | G06F 16/93 709/206 |
| 2013/0155173 | A1* | 6/2013 | Brady | H04L 12/1813 348/14.03 |
| 2014/0241515 | A1* | 8/2014 | Oswal | H04M 3/56 379/93.01 |
| 2016/0105553 | A1* | 4/2016 | Forrester | H04L 12/1822 455/416 |

(Continued)

*Primary Examiner* — Rasha S Al Aubaidi
(74) *Attorney, Agent, or Firm* — Kilpatrick Townsend & Stockton LLP

(57) ABSTRACT

Embodiments automatically establish a communication link with a conference platform using data received from a user device of a user. A conferencing device may interact with a user device to initiate a data transmission from the user device. An application on the user device may scan the contents of the user device for information associated one or more conference calls scheduled for a current time period. Upon identifying a matching conference call, the user device may transmit data associated with the conference call to the conferencing device. The application on the user device or the conferencing device may extract the call-in details (e.g. telephone number, conference code, conference PIN, URL or some other link to the conference) from the information associated with the conference call. The conferencing device may automatically initiate a call (e.g. establish the communication link) with the conference platform using the call-in details.

16 Claims, 15 Drawing Sheets

(56) References Cited

U.S. PATENT DOCUMENTS

2018/0337968 A1* 11/2018 Faulkner ............. H04L 12/1813
2019/0020853 A1*  1/2019 Segal ................. H04N 21/4223
2020/0285685 A1*  9/2020 Crump ................ G06F 16/9554

* cited by examiner

SYSTEM AND METHOD FOR AUTO-INITIATING CONFERENCE CALLS FROM A USER DEVICE

RELATED APPLICATIONS

None.

SUMMARY

Systems and method for automatically initiating a conference call using data retrieved from a user device are disclosed. Embodiments automatically establish a communication link with a conference platform using data received from a user device of a user. A conferencing device may interact with a user device to initiate a data transmission from the user device. An application on the user device may scan the contents of the user device for information associated one or more conference calls scheduled for a current time period. Upon identifying a matching conference call, the user device may transmit data associated with the conference call to the conferencing device. The application on the user device or the conferencing device may extract the call-in details (e.g. telephone number, conference code, conference PIN, URL or some other link to the conference) from the information associated with the conference call. The conferencing device may automatically initiate a call (e.g. establish the communication link) with the conference platform using the call-in details.

Embodiments provide a method for initiating conference calls using data stored on a user device. The method comprises interacting, by a conferencing device, with the user device of a user. The conferencing device receives from the user device, information associated with one or more conference calls scheduled within a predetermined time period, the one or more conference calls including a first conference call. The method also includes establishing, by the conferencing device, a first communication link with a conference platform running on a remote conference server using information associated with the first conference call. Establishing the first communication link initiates the first conference call.

In some embodiments, the method may also include parsing, by the conferencing device, the information associated with the first conference call; and identifying, by the conferencing device, one or more of a telephone number, an internet calling link, an access code, a date, and a time based on parsing.

According to various embodiments, the conferencing device converts a document containing the information associated with the first conference call into machine-encoded text; identifies one or more of a telephone number, an internet calling link, an access code, a date, and a time among the machine-encoded text; and establishes the first communication link with the conference platform using the one or more of the telephone number, the internet calling link, the access code, the date, and the time.

In some embodiments, interacting with the user device includes scanning, by the conferencing device, a barcode storing the information associated with the one or more conference calls within the predetermined time period.

According to some embodiments, the conferencing device, prior to establishing the first communication link with the conference platform, determines that the information received from the user device includes the information associated with the first conference call and information associated with a second conference call scheduled at a same time as the first conference call. The conferencing devices displays a first option for selecting the first conference call and a second option for selecting the second conference call, and receives an input selecting the first option.

In some embodiments, the one or more conference calls includes the first conference call scheduled at a first scheduled time, and a second conference call scheduled at a second scheduled time later than the first scheduled time. The predetermined time period includes the first scheduled time and the second scheduled time. In such embodiments, the method further comprises establishing, by the conferencing device, the first communication link with the conference platform using the information associated with the first conference call when a first current time is equal to the first scheduled time; and establishing, by the conferencing device, a second communication link with the conference platform using information associated with the second conference call when a second current time is equal to the second scheduled time.

According to various embodiments, the conferencing device, prior to establishing the first communication link with the conference platform, accesses a database storing reference information associated with a location assigned to the conferencing device for the predetermined time period. The conferencing device compares the information associated with the first conference call with the reference information stored at the database, and identifies a first reference information matching the information associated with the first conference call.

In some embodiments, the conferencing device receives biometric data of the user. In such embodiments, the conferencing device, prior to establishing the first communication link with the conference platform, accesses a database storing reference information associated with a location assigned to the conferencing device for the predetermined time period, compares the biometric data of the user with the reference information stored at the database, and identifies a first reference information matching the biometric data of the user.

In some embodiments, the conferencing device, prior to establishing the first communication link with the conference platform, receives from the user device, geographic coordinates comprising one or more of a latitude, a longitude, and an elevation position of the user device. The conferencing device compares the geographic coordinates of the user device to geographic coordinates of the conferencing device, and determines that the user device is present at a same location as the conferencing device.

Another embodiment of the invention is directed to a system including a conferencing device programmed to perform the above-noted method. In some embodiments, the system also includes the user device.

These and other embodiments of the invention are described in further detail below.

DETAILED DESCRIPTION

Figure 1:
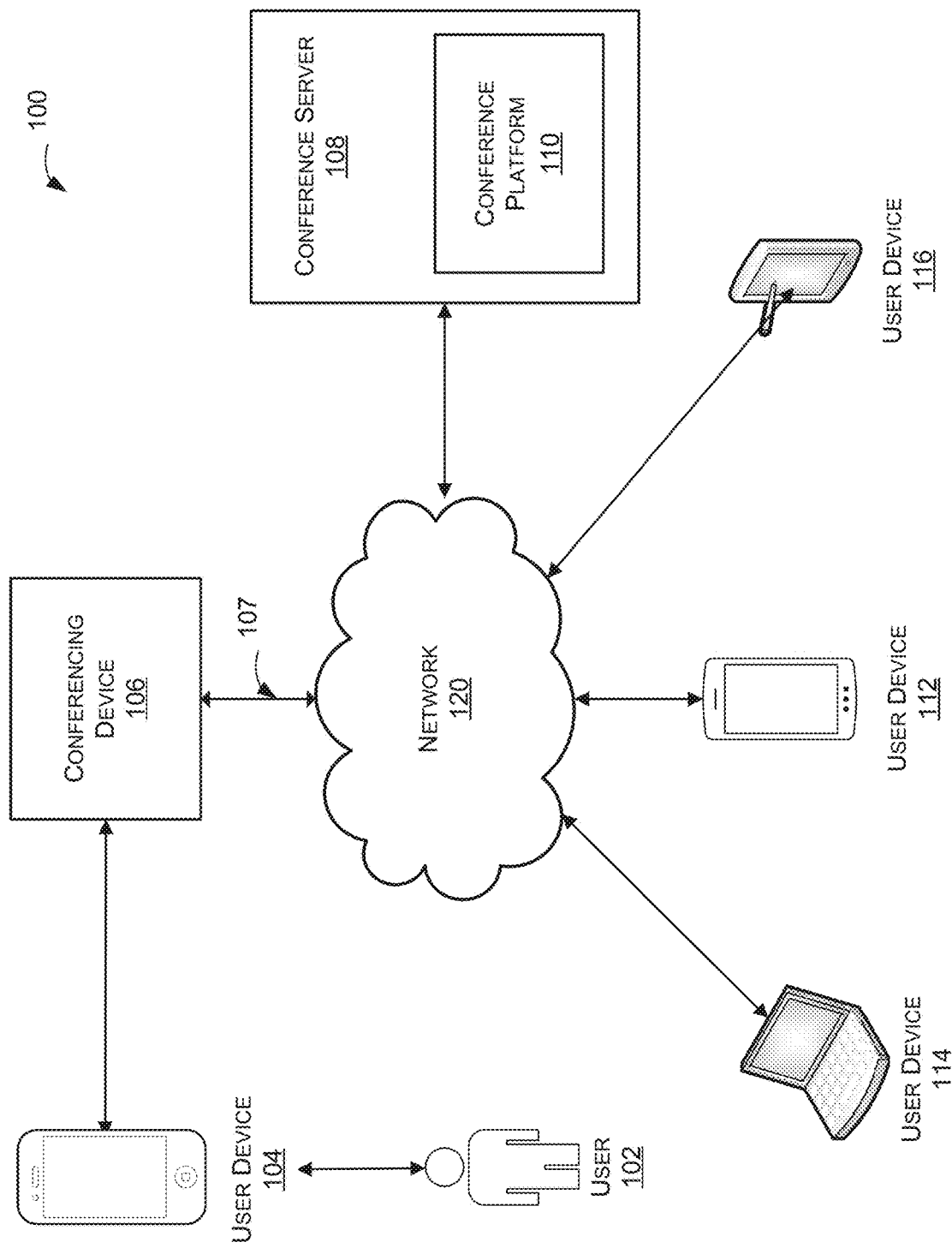
FIG. 1 shows a system for establishing a communication link with a conference platform via a conferencing device using information stored on a user device according to various embodiments.

In corporate settings, employees often need to join conference calls from conference rooms. The typical workflow includes the employee arriving at a conference room, manually dialing into the conference call with either a tablet device, a conference call dial-pad, or a telephone in the conference room. The process is a manual process that requires the employee to take out a user device to look up the call-in details in a calendar application (or alternatively, use a physical printout of the call-in details), dial a telephone number, and then dial a code for the conference call. Sometimes, the employee additionally needs to manually enter in a verification PIN to join the conference call. The process is time-consuming and prone to user error. If the employee makes a mistake, they have to hang up and start over. Often, conference rooms are overbooked, and the employee can only enter the conference room at the beginning of the meeting. Accordingly, being able to quickly join the conference call would help ensure that the employee does not miss the beginning of the conference call.

Conventional systems may use an e-mail or calendar server to automatically connect a conference room to a conference call at a specified time. However, this technique requires the conferencing device to have access to the user's server data with mail/calendar data (e.g. the conferencing device is owned/operated by the same company that owns/operates the mail/calendar servers). However, the user's server data may not always be available to the conferencing device. For example, at a coworking space, the conferencing device may not have access to the user's server data with mail/calendar data because they are separated via a firewall or other similar cybersecurity measures.

What is needed is a way to efficiently allow for a user to quickly join a conference call in a conference room.

Prior to discussing embodiments of the invention, some terms can be described in further detail.

A "user device" may comprise any suitable computing device that can be used for communication. A user device may also be referred to as a "communication device" or a "computing device." A user device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of user devices include desktop computers, videogame consoles, mobile phones (e.g., cellular phones), personal digital assistants (PDAs), tablet computers, net books, laptop computers, personal music players, hand-held specialized readers, etc. Further examples of user devices include wearable devices, such as smart watches, fitness bands, ankle bracelets, rings, earrings, etc., as well as automobiles with remote or direct communication capabilities. A user device may comprise any suitable hardware and software for performing such functions, and may also include multiple devices or components (e.g., when a device has remote access to a network by tethering to another device—i.e., using the other device as a modem—both devices taken together may be considered a single communication device).

An "application" may be a computer program that is used for a specific purpose.

A "user" may include an individual or a computational device. In some embodiments, a user may be associated with one or more user devices. In some embodiments, the user may be an employee or a guest within an office space.

A "conferencing device" may be any device capable of connecting to a remote server to participate in a conference call. A conferencing device may be located at a designated room in an office space. Examples of conferencing devices include desktop computers, videogame consoles, mobile phones (e.g., cellular phones), personal digital assistants (PDAs), tablet computers, net books, laptop computers, personal music players, hand-held specialized readers, etc. The conferencing device may be capable of communicating with user devices, including a mobile device of a user. The conferencing device may receive data from the user device, parse the received data, and establish a communication link with the remote server based on the parsed data.

A "communication link" may refer to an information transmission path that links at least two devices. The communication link may allow the linked devices to exchange information. A communication link may be an actual physical link (e.g. fiber optic link, point-to-point link) or a logical link (e.g., data link, uplink, downlink) that uses one or more physical links or shares a physical link with other communications links. An exemplary communication link may be established via one or more of a communication satellite, a terrestrial radio communications infrastructure and a computer network.

A "conference call" may be an audio and/or a video connection among two or more people. A conference call may support live exchange of information among the participants connected to a conference platform running on a remote (with respect to one or more participants) conference server. There may be one or more hosts (e.g. organizer, administrator) and one or more participants in a conference call.

A "conference platform" may refer to an application running on a server computer that supports audio, video, multimedia communication among two or more users (e.g. participants). An exemplary conference platform may include hardware and software to provide linking communication between telephone, video or multimedia calls of various users.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" or "processor circuit" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron, etc.; IBM and/or Motorola's PowerPC; IBM's and Sony's Cell processor; Intel's Celeron, Itanium, Pentium, Xeon, and/or Xscale, etc.; and/or the like processor(s).

A "memory" or "system memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

While not necessarily described, messages communicated between any of the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS); Secure Socket Layer (SSL), ISO and/or the like.

A "biometric" may be any human characteristic that is unique to an individual. For example, a biometric may be a person's fingerprint, voice sample, face, DNA, retina, etc.

A "biometric reader" may include a device for capturing an individual's biometric data. Examples of biometric readers may include fingerprint readers, front-facing cameras, microphones, and iris scanners.

"Biometric data" includes data that can be used to uniquely identify an individual based upon one or more intrinsic physical or behavioral traits. For example, biometric data may include fingerprint data and retinal scan (e.g. eye scan) data. Further examples of biometric data include digital photographic data (e.g., facial recognition data), deoxyribonucleic acid (DNA) data, palm print data, hand geometry data, and iris recognition data. The biometric data may be obtained by a biometric reader. The data may be either an analog or digital representation of the user's biometric, generated prior to determining distinct features needed for matching. For example, a biometric data of a user's face may be image data. In another example, a biometric data of a user's voice may be audio data.

Embodiments automatically establish a communication link with a remote conference server (e.g. a conference platform running on the remote conference server) using data received from a user device of a user. For example, a user may walk into a conference room in an office space. The conference room maybe equipped with a conferencing device (e.g. a tablet device, a conference call dial-pad, a telephone device) according to various embodiments described herein. The conferencing device may interact with a user device (e.g. a mobile device, smartphone, wearable, etc.) of the user. For example, the user may swipe, wave or otherwise place the user device in close proximity of the conferencing device in the conference room.

The interaction may initiate a data transmission (e.g. via near-field communication (NFC), Wi-Fi, Bluetooth) from the user device to the conferencing device. According to some embodiments, an application (e.g. a conferencing application, a calendar application, an email application, a text messaging application, an image management application, or the like) on the user device may scan the contents of the user device for one or more conference calls (e.g. in form of calendar entries, emails or text messages) for a current time period. Upon identifying a matching conference call, the application on the user device may transmit information associated with the conference call to the conferencing device. In some embodiments, the application on the user device may extract the call-in details (e.g. telephone number, conference code, conference PIN, URL or some other link to the conference) from the conference call entry, and forward the call-in details to the conferencing device during the interaction. In other embodiments, the conferencing device may parse the information received from the user device, identify and extract the call-in details (e.g. telephone number, conference code, conference PIN, URL or some other link to the conference call) from the parsed data. The conferencing device may automatically initiate a call (e.g. establish the communication link) with the conference server (e.g. the conference platform running on the conference server) using the call-in details.

FIG. 1 shows a system 100 for establishing a communication link 107 with a conference platform 110 via a conferencing device 106 using information stored on a user device 104 according to various embodiments. The conferencing device 106 may be provided at a conference room of an office space. User 102 of the user device 104 may enter the office space or otherwise arrive in close proximity of the conferencing device 106. The conferencing device 106 may interact with the user device 104 of the user 102. The user 102 may store conference call details (e.g. invitations) in form of calendar entries associated with a calendar application, e-mails, text messages, images (e.g. photographs, screenshots), documents, etc. on a memory of the user device 102.

The conferencing device 106 may receive information associated with a conference call from the user device 104. The information may include one or more of a telephone number, an internet calling link, an access code, a date, and a time. According to various embodiments, the conferencing device 106 may receive information associated with one or more conference calls scheduled within a predetermined time period, such as within 3 or 5 minutes of the current time. For example, the conferencing device 106 may be configured to receive information associated with conference call scheduled 3 or 5 minutes before the current time, as well as 3 or 5 minutes after the current time. This way, the conferencing device 106 may be able to connect to a conference call even when the user 102 is slightly late or early for the call. One of ordinary skill in the art will appreciate that the time range of 3 or 5 minutes is given for illustrative purposes only, and that the time range within which the conferencing device 106 can receive conference call information can be adjusted.

The conferencing device 106 may receive the information from the user device 104 through any suitable means. In some embodiments, the conferencing device 106 may receive the information from the user device 104 via any wired or wireless short range communication (e.g. near-field communication (NFC) connection, a Bluetooth connection, Wi-Fi connection). For example, the user 102 may swipe or wave the user device 104 near the conferencing device 106. In some embodiments, the conferencing device 106 may identify the user device 104 as a device that can be paired with. The conferencing device 106 may then pair with the user device 104 through, for example, a Bluetooth connection.

In other embodiments, the conferencing device may receive the information from the user device 104 by taking an optical scan or photograph of conference call details being displayed a display screen of the user device 104, thus no wired or wireless short range communication is necessary. The conferencing device 106 may use an application stored on the user device to scan the user device 104 for conference call information, and send the identified conference call information to the conferencing device 106. The application may scan all memory locations that may contain conference call information, such as the calendar entries, e-mails, text messages (e.g. SMS), social media applications (e.g. WhatsApp, Facebook, Instagram), etc. In some embodiments, the conferencing device 106 may include a barcode reader to scan a barcode containing the conference call information presented on a display screen of the user device 104.

Upon receiving the conference call information, the conferencing device 106 may parse the received information associated with a conference call. In some embodiments, the conference call information received from the user device 104 may be in machine-encoded (e.g. machine readable) text form. In such embodiments, the conferencing device 106 may identify one or more of the telephone number, the internet calling link, the access code, the date, and the time based on parsing without requiring additional processing of the received information. The conferencing device 106 may initiate the conference call by establishing the communication link 107 with the conference platform 110 using the conference call details received from the user device 104.

In some embodiments, the conference call information received from the user device 104 may not be in machine-encoded text form (e.g. the information may be non-machine readable). For example, the conference call information may be embedded in a screenshot, an image or a file (e.g. a document in a portable document format (PDF)). In such embodiments, the conferencing device 106 may first convert the document containing the information associated with the conference call into machine-encoded text. For example, the conferencing device 106 may perform an Optical Character Recognition (OCR) processing on the received information. It is advantageous to use OCR technology at the conferencing device to scan and interpret conference call details because different users may have different types of user devices (e.g., different types of mobile phones from different manufacturers). By using the OCR technology, the conferencing device can interact with any type of user device in embodiments of the invention, thus making the system more robust. The conferencing device 106 may then parse the information in the machine readable format, and identify one or more of the telephone number, the internet calling link, the access code, the date, and the time based on parsing. The conferencing device 106 may initiate the conference call by establishing the communication link 107 with the conference platform 110 using the one or more of the telephone number, the internet calling link, the access code, the date, and the time.

According to various embodiments, the conference platform 110 may run on a remote conference server 108. The conferencing device 106 may connect to the conference platform 110 via the communication link 107 through a network 120. The network 120 may be any suitable network, including but not limited to, an Enterprise Private Network (EPN), a Local Area Network (LAN), a Wide Area Network (WAN) (e.g. Internet). One or more additional participants to the conference call may connect to the conference platform 110 through the network 120 using their user devices 112, 114, and 116.

Figure 2:
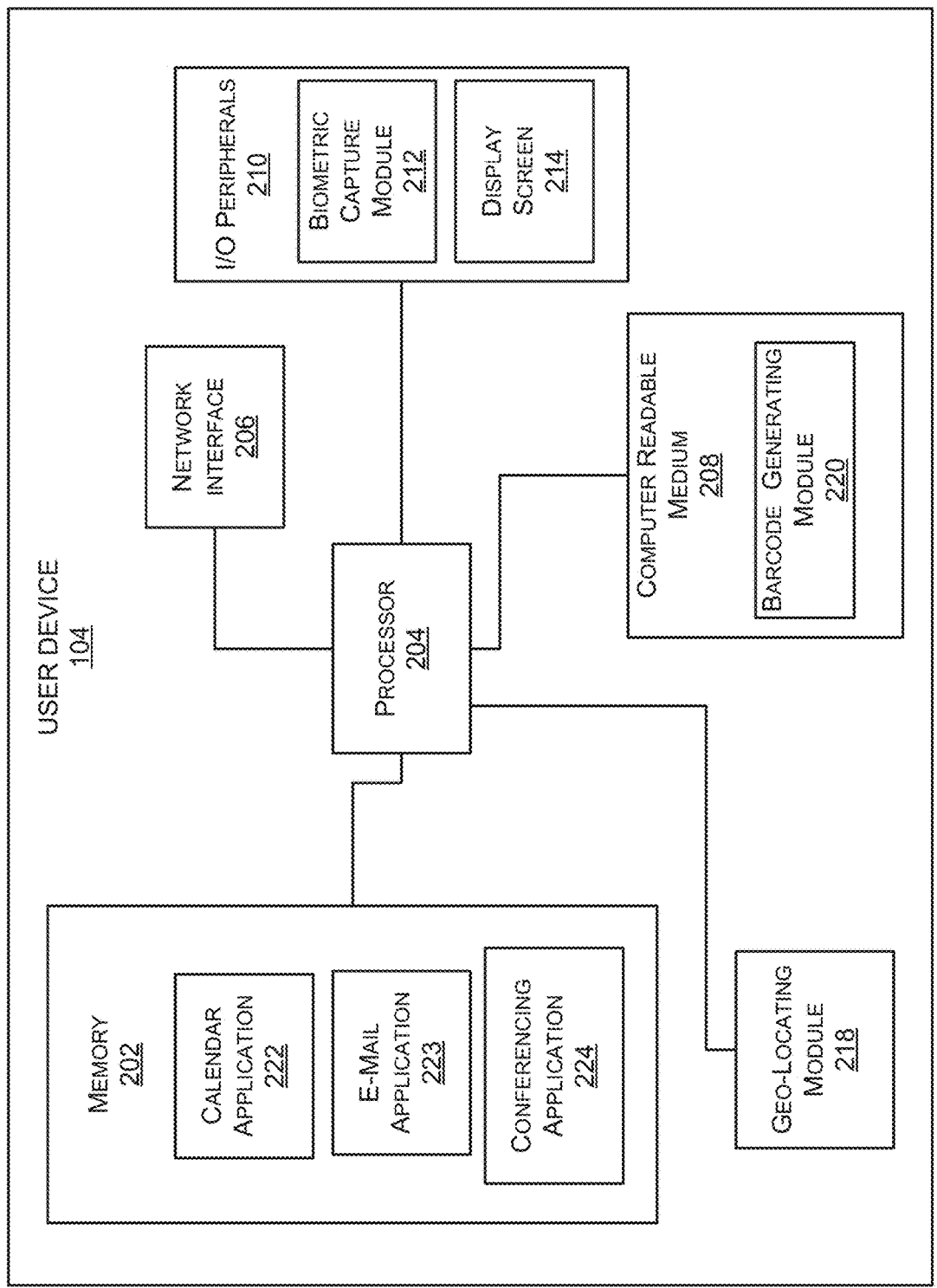
FIG. 2 shows an exemplary user device according to various embodiments.

FIG. 2 shows an exemplary user device 104 according to various embodiments. The user device 104 may include a memory 202, a processor 204, a network interface 206, a computer readable medium 208, input/output peripherals 210, and a geo-locating module 218 (e.g. a Global Positioning System (GPS) receiver circuitry and/or an altimeter for detecting elevation position of the user device 104).

The processor 204 can be implemented as one or more integrated circuits (e.g., one or more single core or multicore microprocessors and/or microcontrollers), and is used to control the operation of the user device 104. The processor 204 can execute a variety of programs in response to program code or computer-readable code stored in the memory 202, and can maintain multiple concurrently executing programs or processes.

The memory 202 can be implemented using any combination of any number of non-volatile memories (e.g., flash memory) and volatile memories (e.g. DRAM, SRAM), or any other non-transitory storage medium, or a combination thereof media. The memory 202 may store computer code, executable by the processor 204, for performing any of the functions described herein.

The memory 202 may also store one or more applications (e.g. a calendar application 222, an e-mail application 223) and a conferencing application 224. The conferencing application 224 may comprise code, executable by the processor 204, to communicate with the external conferencing device 106. The conferencing application 224 may comprise code, executable by the processor 204, to scan the user device 104 for conference call information, and send the identified conference call information to the conferencing device 106. The conferencing application 224 may scan the entire memory 202 (including the calendar entries, e-mails, text messages (e.g. SMS), social media applications) for conference call entries or conference call information.

The input/output peripherals 210 may include devices that allow the user device 104 to input and output data. Examples of input devices include a biometric capture module 212, as well keypads, touchscreens, sensors, peripheral devices such as mice, electronic stylus, etc. Examples of output elements may include a display screen 214, as well as speakers, and tactile devices.

The network interface 206 (as well as the other network interfaces described herein) may be any suitable combination of hardware and software that enables data to be transferred to and from the user device 104. The network interface 206 may allow the user device 104 to communicate data to and from another device (e.g., conferencing device 106). Some examples of the network interface 206 may include a modem, a physical network interface (such as an Ethernet card or other Network Interface Card (NIC)), a virtual network interface, a communications port, a Personal Computer Memory Card International Association (PCM-CIA) slot and card, near-field communication (NFC) circuitry, Bluetooth circuitry, or the like. The wireless protocols enabled by the network interface 206 may include Wi-Fi™.

The user device 104 may also include the geo-locating module 218 that may comprise code, executable by the processor 204, for determining the geographic coordinates comprising one or more of a latitude, a longitude, and an elevation position of the user device 104, and transmitting the geographic coordinates to the conferencing device 106 via, for example, the conferencing application 224.

In some embodiments, the geo-locating module 218 may determine the geographic coordinates of the user device 104 and send the geographic coordinates to the conferencing application 224. The conferencing application 224 may comprise code, executable by the processor 204, for determining that the user 102 has stepped into the conference room associated with the conference call at the top of the hour that matches the calendar entry. For example, the conferencing application 224 may determine the that the user is at the correct location based on previously stored information such as the location of the conference room, and the name or IP address of the conferencing device 106. The conferencing application 224 may then send the information associated with the conference call to the conferencing device 106. In some embodiments, the information may be sent to the conferencing device 106, without the conferencing device 106 interacting with the user device 104 (e.g. without swiping or waving the user device 104 by the conferencing device 106).

The computer readable medium 208 may store code or instructions for allowing the user device 104 to operate in the manner described herein. The instructions may be executed by the processor 204. In some embodiments, the computer readable medium 208 may include code, executable by the processor 204 for performing a method including scanning, using the first application, the memory for one or more entries associated with the one or more conference calls, wherein each entry stores the information associated with a corresponding conference call; identifying the one or more entries associated with the one or more conference calls; and transmitting to the conferencing device, the information associated with the one or more conference calls scheduled within the predetermined time period. The one or more entries associated with the one or more conference calls may be stored on the calendar application 222 or the e-mail application 223.

The computer readable medium 208 may also include a barcode generating module 220 that may comprise code, executable by the processor 204, for generating a barcode (e.g. a Quick Response (QR) code) readable by the conferencing device 106 using the information associated with the one or more conference calls identified by, for example, the conferencing application 224. The generated barcode may be displayed on the display screen 214 of the user device 104 (as illustrated in FIG. 3E), and a barcode reader of the conferencing device 106 may receive the information associated with the one or more conference calls by scanning the barcode.

Figure 3A:
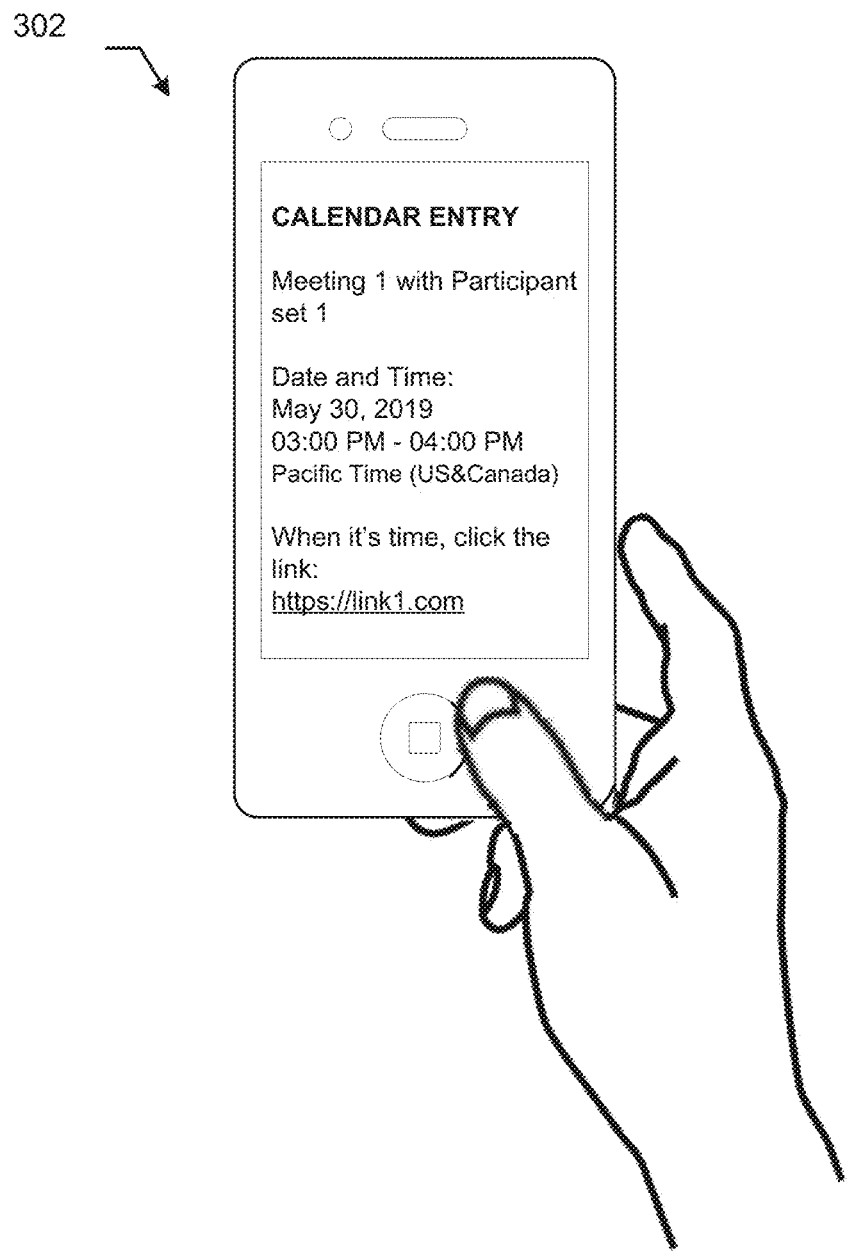
FIG. 3A shows an exemplary conference call invitation in form of a calendar entry including a hyperlink on a user device according to various embodiments.
Figure 3B:
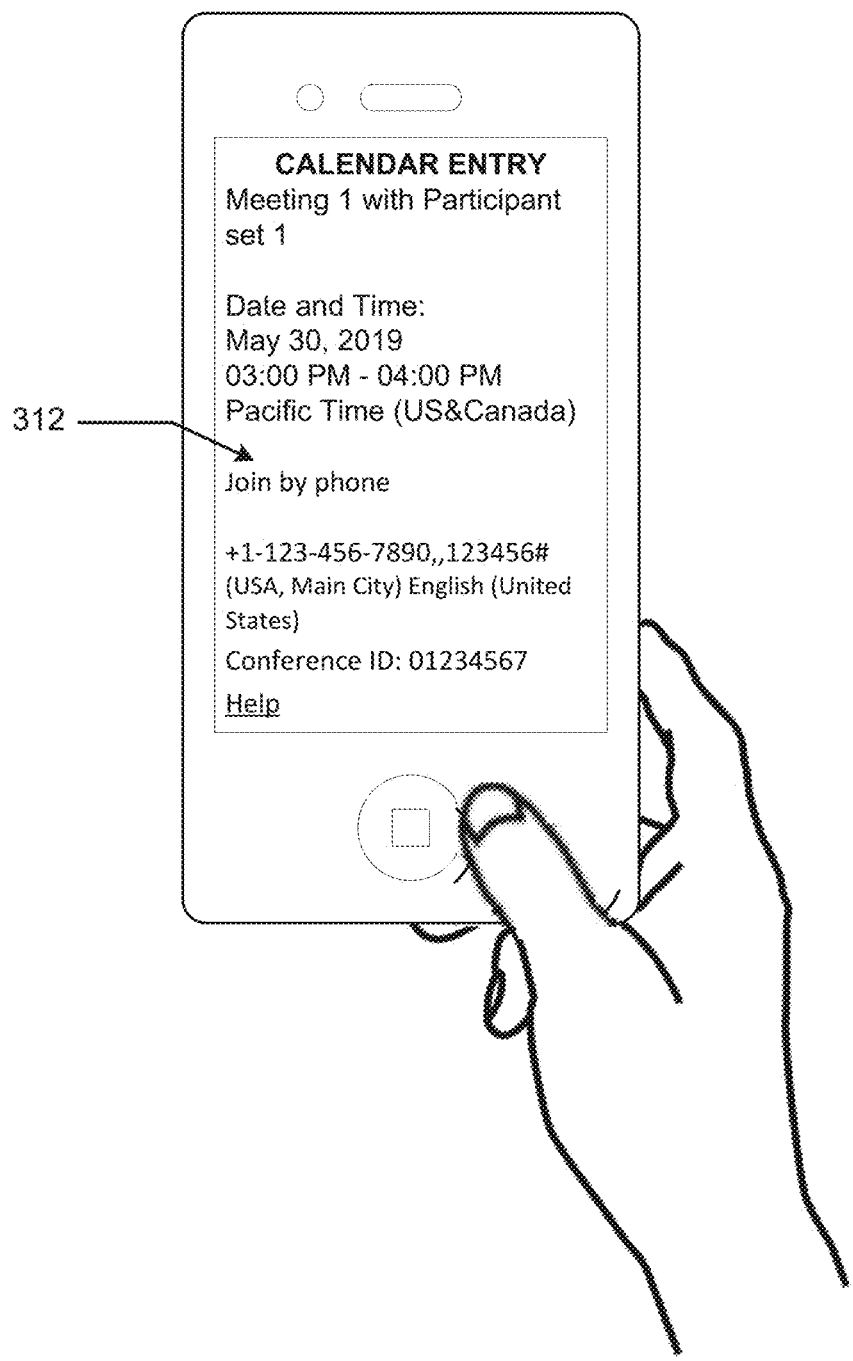
FIG. 3B shows an exemplary conference call invitation in form of a calendar entry including dial-in details on a user device according to various embodiments.
Figure 3C:
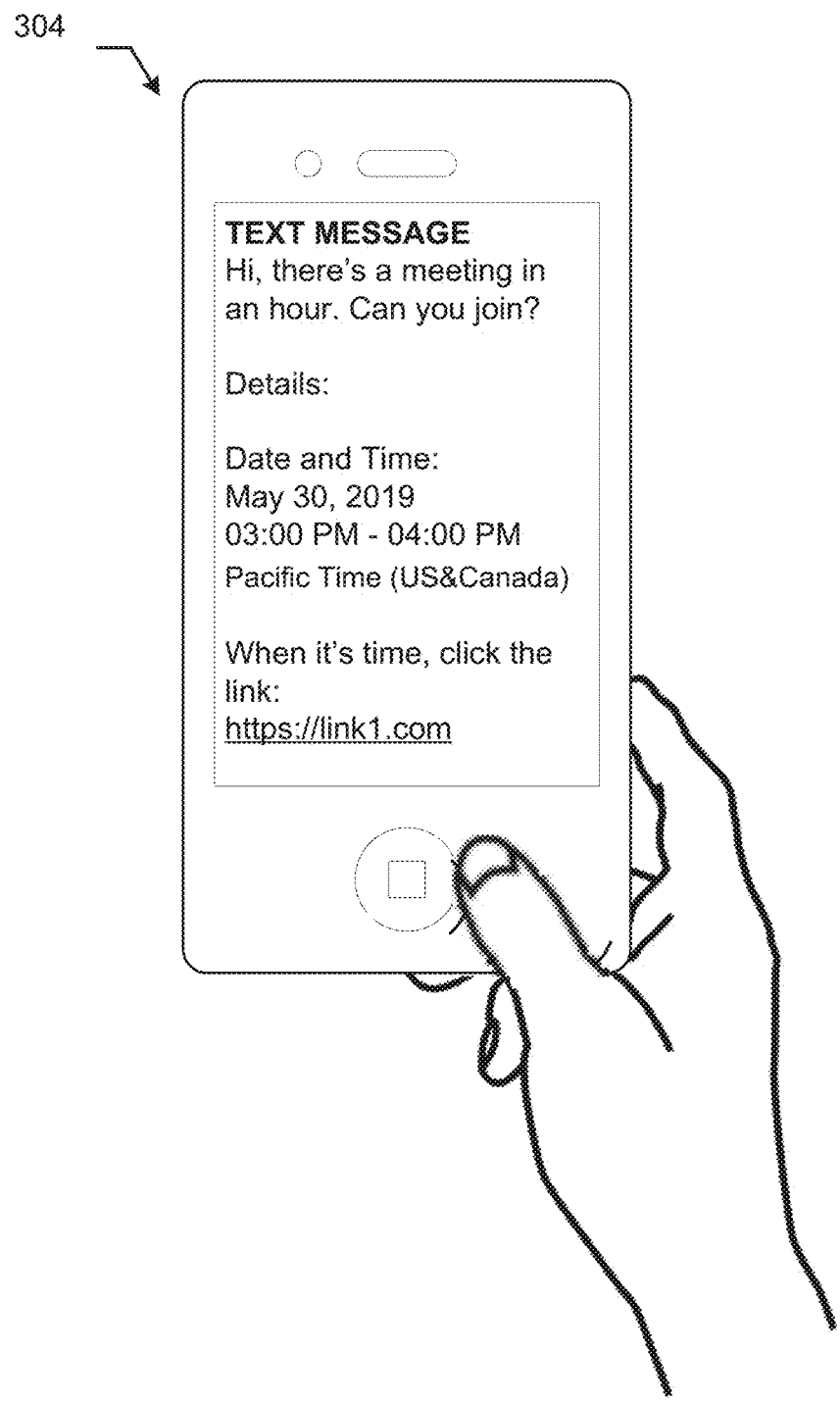
FIG. 3C shows an exemplary conference call invitation in form of a text message including selectable (e.g. hyperlinked, machine encoded or machine readable) information associated with conference call(s) on a user device according to various embodiments.
Figure 3D:
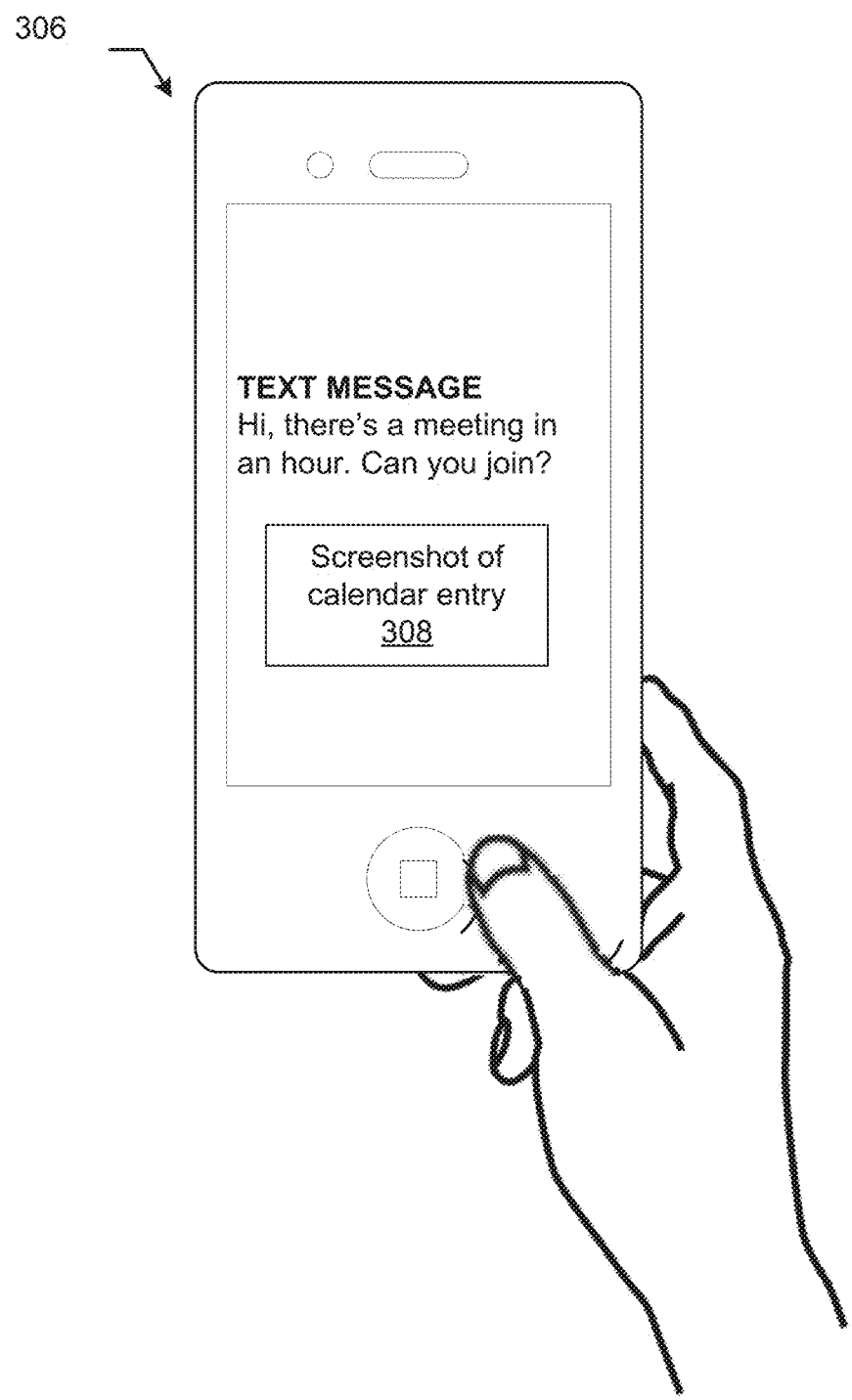
FIG. 3D shows an exemplary conference call invitation in form of a text message including non-selectable information associated with conference call(s) (e.g. in form of an image, non-machine readable) on a user device according to various embodiments.
Figure 3E:
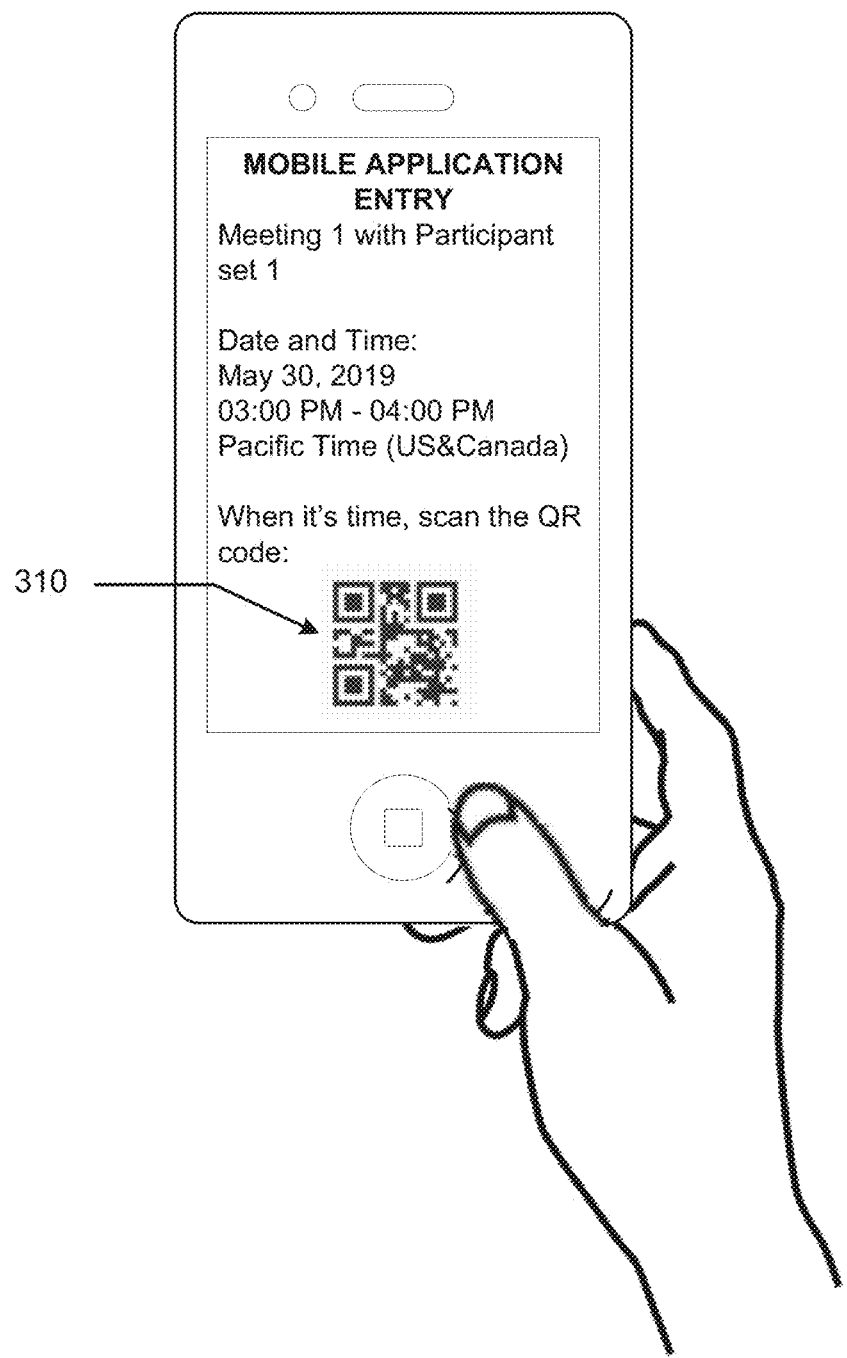
FIG. 3E shows an exemplary conference call invitation in form of a barcode on a user device according to various embodiments.

As described above, the user device 104 may store conference call information in various formats including, but not limited to, a calendar entry 302 illustrated in FIG. 3A including a hyperlink for the meeting, a calendar entry 312 illustrated in FIG. 3B including dial in details for the meeting, a text message including machine-encoded (e.g. machine readable) text 304 illustrated in FIG. 3C, a text message including non-machine-encoded (e.g. non-machine readable) text 306, such as an image (e.g. screenshot) of a calendar entry 308, illustrated in FIG. 3D, or a barcode 310 generated by the barcode generating module 220, illustrated in FIG. 3E. Embodiments enable identification and communication of conference call information in any format to the conferencing device 106. The conferencing device 106 being agnostic to the server where the conference call information is stored, may parse the conference call information and identify one or more of a telephone number, an internet calling link, an access code, a date, and a time based on parsing.

Figure 4:
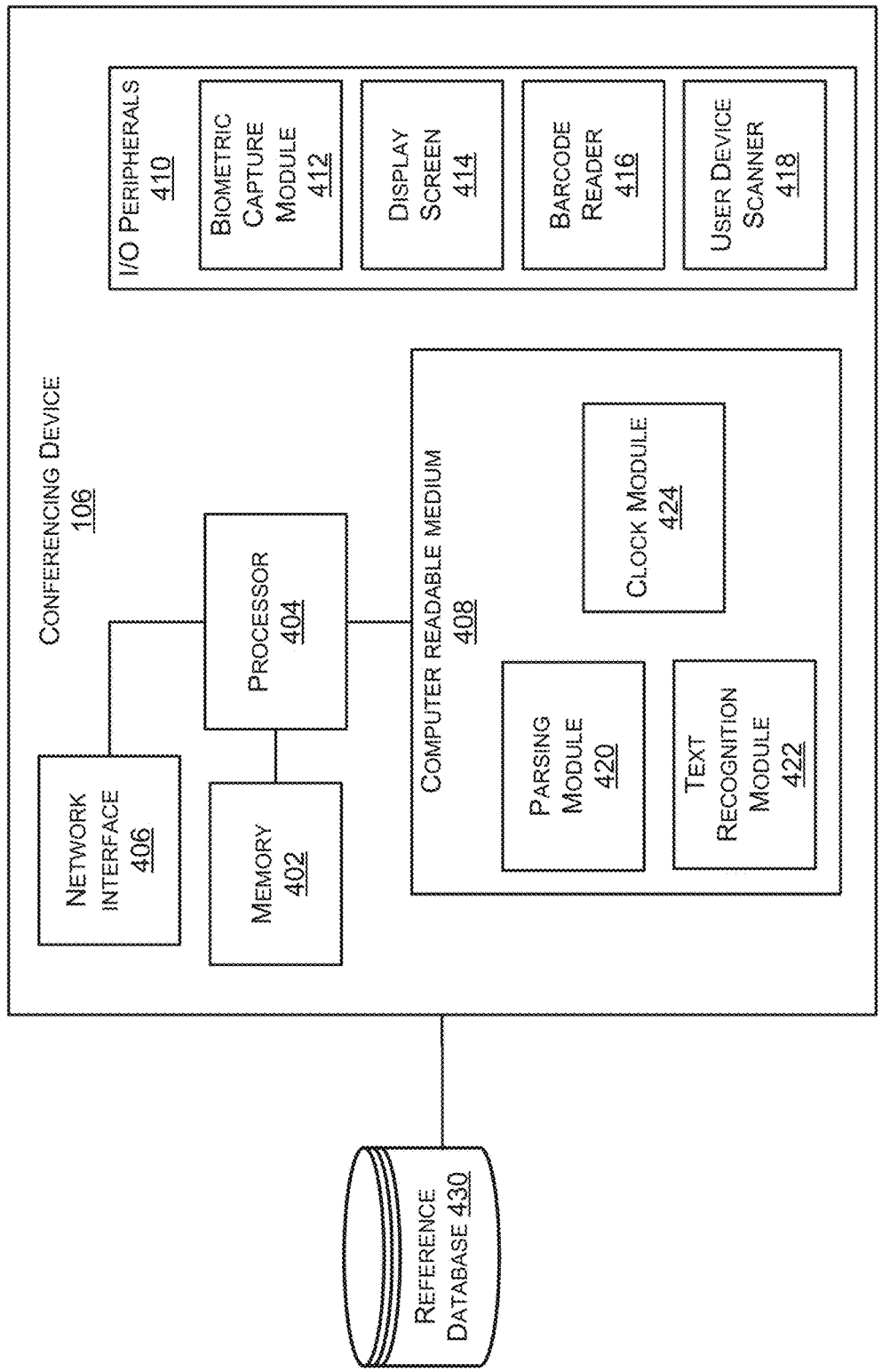
FIG. 4 shows an exemplary conferencing device according to various embodiments.

FIG. 4 shows an exemplary conferencing device 106 according to various embodiments. The conferencing device 106 may include a memory 402, a processor 404, a network interface 406, a computer readable medium 408, and input/output peripherals 410.

The processor 404 can be implemented as one or more integrated circuits (e.g., one or more single core or multicore microprocessors and/or microcontrollers), and is used to control the operation of the conferencing device 106. The processor 404 can execute a variety of programs in response to program code or computer-readable code stored in the memory 402, and can maintain multiple concurrently executing programs or processes.

The memory 402 can be implemented using any combination of any number of non-volatile memories (e.g., flash memory) and volatile memories (e.g. DRAM, SRAM), or any other non-transitory storage medium, or a combination thereof media. The memory 402 may store computer code, executable by the processor 404, for performing any of the functions described herein.

The input/output peripherals 410 may include devices that allow the conferencing device 106 to input and output data. Examples of input devices include a biometric capture module 412, a barcode reader 416, a user device scanner 418, as well keypads, touchscreens, sensors, peripheral devices such as mice, electronic stylus, etc. Examples of output elements may include a display screen 414, as well as speakers, and tactile devices.

The computer readable medium 408 may store code or instructions for allowing the conferencing device 106 to operate in the manner described herein. The instructions may be executed by the processor 404. In some embodiments, the computer readable medium 408 may include code, executable by the processor 404 for performing a method including interacting with the user device 104 of a user. For example, the user may wave or scan the user device 104 by the conferencing device 106. The conferencing device 106 may interact with the user device 104 by scanning the user device 104 with the user device scanner 418. In some embodiments, the conferencing device 106 may interact with the user device 104 by scanning a barcode displayed on the display screen 214 of the user device 104 with the barcode reader 416. In embodiments where the conferencing device 106 retrieves data from the user device 104 by scanning a display screen 214 or taking a picture of the display screen 314 of the user device 104, there may be no wired or wireless short range communication and/or connection between the conferencing device 106 and the user device 104.

The method performed by the processor 404 executing the code on the computer readable medium 408 may further include receiving, by the conferencing device 106 from the user device 104, information associated with one or more conference calls scheduled within a predetermined time period, the one or more conference calls including a first conference call.

In some embodiments, the information associated with the one or more conference calls within the predetermined time period may be received in a variety of formats including, but not limited to, a calendar entry, an e-mail or a text message including machine-encoded (e.g. machine readable) text, an e-mail or a text message including non-machine-encoded (e.g. non-machine readable) text, such as an image (e.g. screenshot) of a calendar entry, or the barcode scanned using the barcode reader 416.

In some embodiments, the computer readable medium 408 may include a parsing module 420 storing code, executable by the processor 404 for parsing the information associated with the conference call received from the user device 104. Upon parsing, the conferencing device 106 may identify one or more of a telephone number, an internet calling link, an access code, a date, and a time based on parsing.

According to various embodiments, the computer readable medium 408 may also include a text recognition module 422 storing code, executable by the processor 404 for converting a document containing the information associated with the conference call into machine-encoded text. The conferencing device 106 may then identify one or more of a telephone number, an internet calling link, an access code, a date, and a time among the machine-encoded text and establish the communication link with the conference platform using the one or more of the telephone number, the internet calling link, the access code, the date, and the time.

The method performed by the processor 404 executing the code on the computer readable medium 408 may further include establishing, a first communication link with a conference platform running on a remote conference server using information associated with the first conference call to initiate the first conference call. According to various embodiments, the conferencing device 106 may establish a communication link with a conference platform running on a remote conference server using the network interface 406.

The network interface 406 (as well as the other network interfaces described herein) may be any suitable combination of hardware and software that enables data to be transferred to and from the conferencing device 106. The network interface 406 may allow the conferencing device 106 to communicate data to and from another device (e.g., user device 104, the conference server 108). Some examples of the network interface 406 may include a modem, a physical network interface (such as an Ethernet card or other Network Interface Card (NIC)), a virtual network interface, a communications port, a Personal Computer Memory Card International Association (PCMCIA) slot and card, near-field communication (NFC) circuitry, Bluetooth circuitry, or the like. The wireless protocols enabled by the network interface 406 may include Wi-Fi™.

Figure 5A:
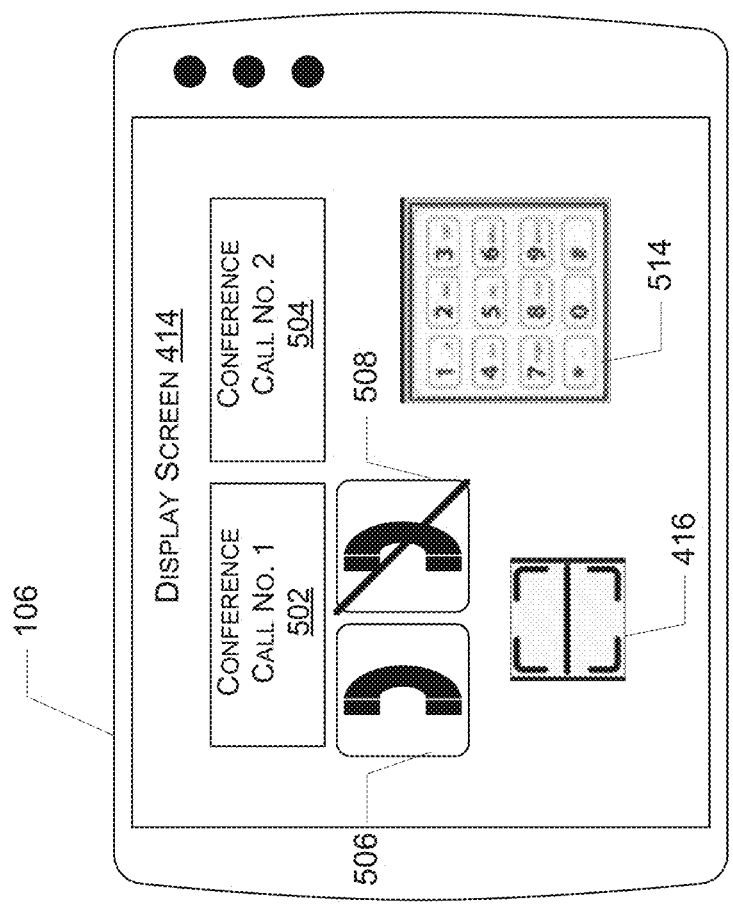
FIG. 5A shows an exemplary conferencing device displaying multiple conference call options according to various embodiments.

According to various embodiments, multiple conference calls may be scheduled at the same time. For example, when the conferencing application 224 of the user device 104 scans the user device 104 for conference call information, the conferencing application 224 may identify multiple conference calls scheduled at the same time. In some embodiments, the conferencing application 224 may display all options to user on the user device 104, receive a user input for selecting one conference call, and send the information for the selected conference call to the conferencing device 106. In other embodiments, the conferencing application 224 may send information associated with all identified conference calls to the conferencing device 106. The conferencing device 106 may display the conference call options to the user. FIG. 5A shows an exemplary conferencing device displaying multiple conference call options according to various embodiments.

Prior to establishing the communication link with the conference platform, the conferencing device 106 may determine that the information retrieved from the user device 104 includes information associated with a first conference call and information associated with a second conference call scheduled at the same time as the first conference call. As illustrated in FIG. 5A, the conferencing device 106 may display, for example on the display screen 414, a first option 502 for selecting the first conference call and a second option 504 for selecting the second conference call. The conferencing device 106 may then receive an input selecting one of the options 502, 504 (e.g. for example, the first option 502). The conferencing device 106 may receive the user input via any suitable means (e.g. user touch on the touchscreen display, stylus touch, audio command). Upon receiving the user input, the conferencing device 106 may initiate the first conference call, and notify the user by displaying a message, such as message 516 illustrated in FIG. 5B.

Figure 5B:
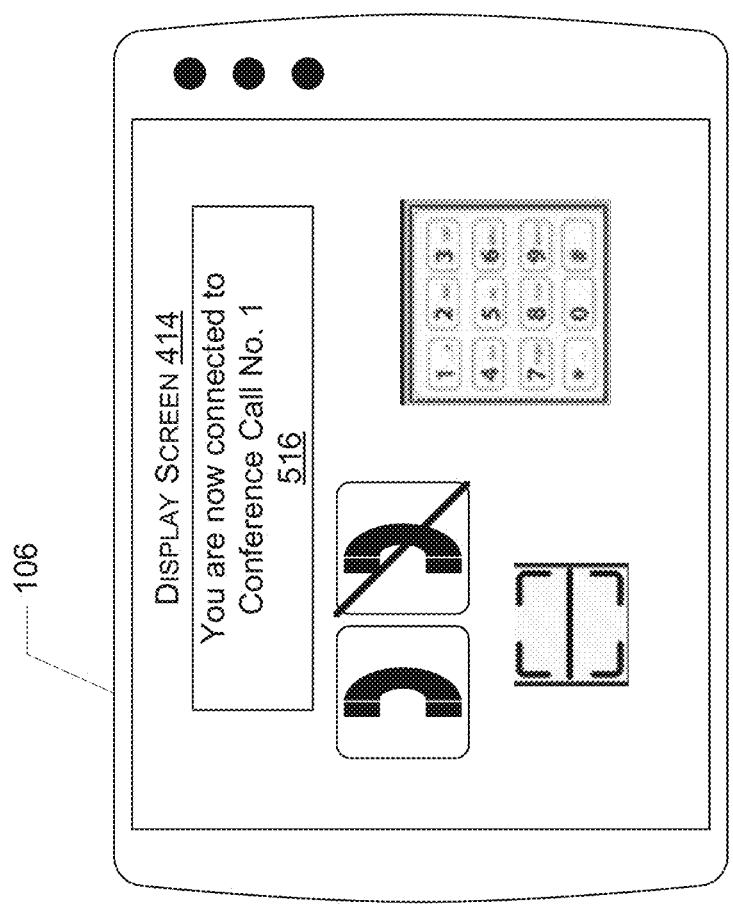
FIG. 5B shows an exemplary conferencing device displaying a selected conference call option according to various embodiments.

As shown in FIGS. 5A and 5B, the display screen 414 of the conferencing device 106 may be a touch screen including a plurality of icons for performing various functions. For example, the display screen 414 may include a dial icon 506 for connecting to a call, a hang up icon 508 for disconnecting from a call, the barcode reader 416 for reading barcodes (e.g. a barcode displayed on the user device 104), and a keypad 514 for manually entering a telephone number or a passcode. One of ordinary skill in the art will appreciate that the conferencing device 106 may include more or less buttons, icons associated with various functionalities.

According to various embodiments, the user may have multiple back-to-back conference calls scheduled within a predetermined time (e.g. 1 hour, 2 hours, 6 hours). For example, the information received from the user device 104 may include information associated with a first conference call scheduled at a first scheduled time, and a second conference call scheduled at a second scheduled time later than the first scheduled time. The predetermined time may include the first scheduled time and the second scheduled time. Thus, the conferencing device 106 may receive the information for all conference calls at the same time, and then connects to the appropriate conference call when it is time. In another embodiment, the connecting device 106 may receive the information for all conference calls at the same time, and when the first conference call concludes by the user using the hang up icon 508, the user may be prompted via the conferencing device 106 to dial into the second conference call.

The computer readable medium 408 may include a clock module 424 for determining the current time. The conferencing device 106 may establish the first communication link with the conference platform using the information associated with the first conference call when the current time is equal to the first scheduled time. Then, the conferencing device 106 may establish a second communication link with the conference platform using information associated with the second conference call when the current time is equal to the second scheduled time.

Embodiments may provide for the conferencing device 106 to check the data received from the user device (e.g. information associated with conference calls, user data, user biometric data) against reference information stored at a database. For example, reference information such as conference calls associated with a location assigned to the conferencing device 106 may be stored at a reference database 430. Prior to prior to establishing the communication link with the conference platform, the conferencing device 106 may access the reference database 430, and compare the information received from the user device with the reference information stored at the reference database 430. The conferencing device 160 may initiate the conference call (e.g. establish the communication link with the conference platform) after identifying a reference information matching the information associated with the conference call received from the user device.

The conferencing device may also check other type of data against the reference data stored at the reference database 430. For example, the conferencing device 160 may receive biometric data of the user, and the reference database 430 may store reference biometric data of users (e.g. employees of a company). In some embodiments, the conferencing device 106 may receive the biometric data of the user from the user device 104. In other embodiments, the conferencing device 106 may include a biometric capture module 412 to capture the biometric data of the user directly from the user. For example, the biometric capture module 412 may include a fingerprint scanner, and when the user presses their finger on the biometric capture module 412, the biometric data may be captured. Thereafter, prior to establishing the communication link with the conference platform, the conferencing device may access the reference database 430, and compare the biometric data of the user with the reference information stored at the reference database 430. The conferencing device 160 may initiate the conference call (e.g. establish the communication link with the conference platform) after identifying a reference information matching the biometric data of the user. This process may indicate that the user is expected to be (e.g. scheduled to participate to a conference call) at the conference room where the conferencing device is provided.

According to some embodiments, the conferencing device 106 may determine whether an identified user device is at a same location (e.g. a conference room) as the conferencing device 106. In some embodiments, the conferencing device 106 may receive, from the user device 104, geographic coordinates comprising one or more of a latitude, a longitude, and an elevation position of the user device 104. Thereafter, prior to establishing the communication link with the conference platform, the conferencing device may compare the geographic coordinates of the user device 104 to geographic coordinates of the conferencing device 106. The geographical coordinates of the conferencing device 106 may be previously stored at a memory 402 of the conferencing device 106. The use of elevation position data may assist the conferencing device in performing this comparison where the building has multiple conference rooms on different building floors in the same latitude and longitude position. Alternatively, the conferencing device 106 may include a geolocation device (e.g. a GPS) that determines the geographical coordinates of the conferencing device 106. The conferencing device 160 may initiate the conference call (e.g. establish the communication link with the conference platform) after identifying that the user device is present at a same location as the conferencing device. In some embodiments, conference calls may be confidential with respect to a certain set of individuals. Therefore, ensuring that only those individuals who should have been invited are present is desirable.

Embodiments may implement techniques to ensure that the person attending the conference call is the person who is actually allowed to attend the conference call. For example, there may be a shared secret code between the authorized user device (e.g., a digital signature, cryptogram, or code from the user device) and the conference device. Before initiating the conference call, the conferencing device may ask the user to provide (or the user may provide) a secret code that was previously shared with both the conferencing device and the user device. Upon confirming the validity of the secret code (e.g. by comparing with the secret code stored at the memory of the conferencing device or at the database), the conferencing device 160 may initiate the conference call (e.g. establish the communication link with the conference platform).

Figure 6:
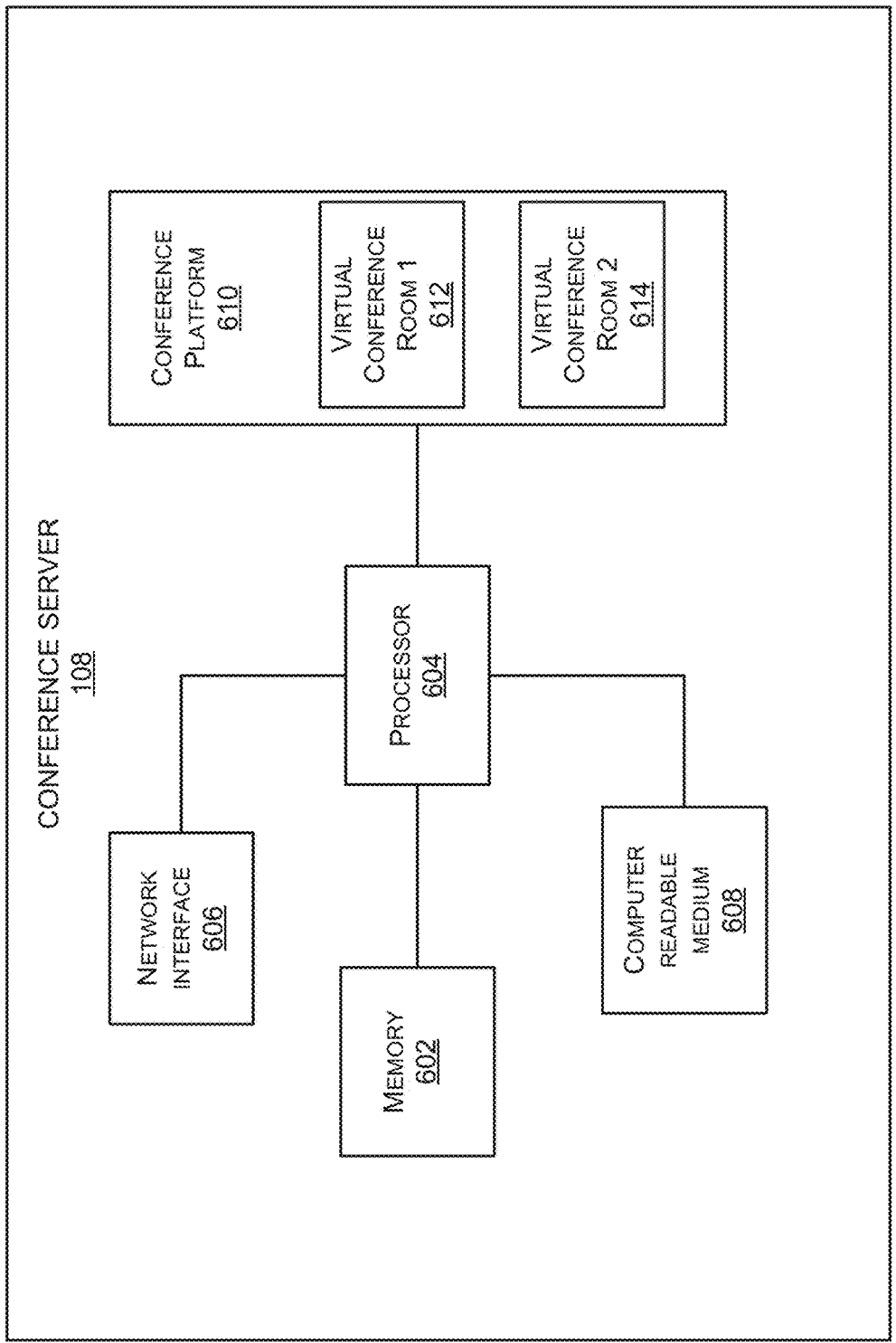
FIG. 6 shows an exemplary conference server according to various embodiments.

FIG. 6 shows an exemplary conference server 108 according to various embodiments. The conference server 108 may include a memory 602, a processor 604, a network interface 606, a computer readable medium 608, and a conference platform 610. According to various embodiments, the conference server 108 may include one or more of a conference bridge, a Private Branch Exchange (PBX) server, Voice over Internet Protocol (VoIP).

The processor 604 can be implemented as one or more integrated circuits (e.g., one or more single core or multicore microprocessors and/or microcontrollers), and is used to control the operation of the conference server 108. The processor 604 can execute a variety of programs in response to program code or computer-readable code stored in the memory 602, and can maintain multiple concurrently executing programs or processes.

The memory 602 can be implemented using any combination of any number of non-volatile memories (e.g., flash memory) and volatile memories (e.g. DRAM, SRAM), or any other non-transitory storage medium, or a combination thereof media. The memory 602 may store computer code, executable by the processor 604, for performing any of the functions described herein.

The network interface 606 (as well as the other network interfaces described herein) may be any suitable combination of hardware and software that enables data to be transferred to and from the conference server 108. The network interface 606 may allow the conference server 108 to communicate data to and from another device (e.g., conferencing device 106, user devices 112, 114, 116). Some examples of the network interface 606 may include a modem, a physical network interface (such as an Ethernet card or other Network Interface Card (NIC)), a virtual network interface, a communications port, a Personal Computer Memory Card International Association (PCMCIA) slot and card, near-field communication (NFC) circuitry, Bluetooth circuitry, or the like. The wireless protocols enabled by the network interface 606 may include Wi-Fi™.

The conference server 108 may also include the conference platform 610. The conference platform 610 may be configured to simultaneously provide a plurality of virtual conference rooms, each having a plurality of participants. For example, a first virtual conference room 612 with a first set of participants may be active (e.g. live) at the same time as a second virtual conference room 614 with a second set of participants.

The computer readable medium 608 may store code or instructions for allowing the conference server 108 to operate in the manner described herein. The instructions may be executed by the processor 604. In some embodiments, the computer readable medium 608 may include code, executable by the processor 604 for establishing a first communication link with a conferencing device 106, and a second communication link with a user device 112, 114, 116. According to various embodiments, the conference server 108 may be remote with respect to the conferencing device 106 and the user devices 104, 112, 114, 116. In some embodiments, the conference server 108 may be configured on the cloud (e.g. the conference server 108 may be a cloud server).

Figure 7:
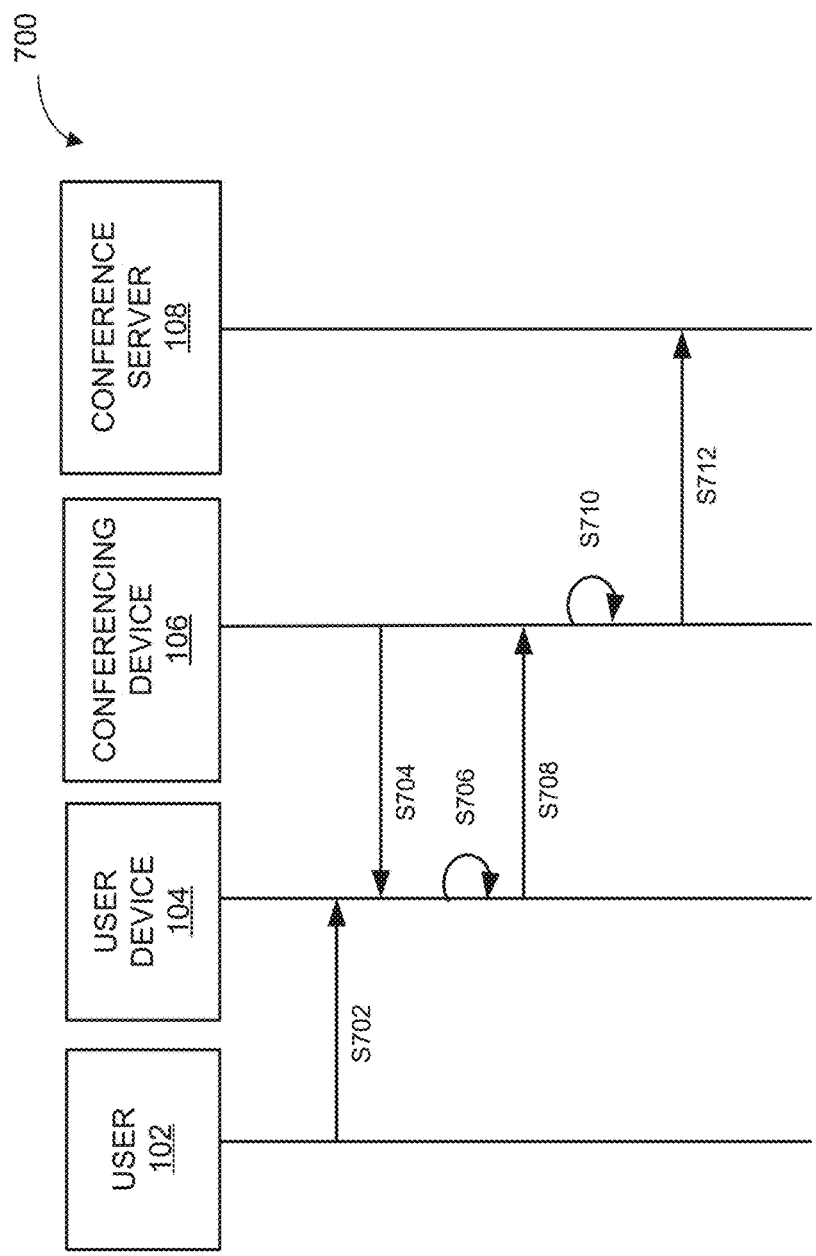
FIG. 7 shows a flowchart illustrating a method for establishing a communication link with a conference platform running on a remote conference server using data received from a user device, according to various embodiments.

FIG. 7 shows a flowchart 700 illustrating a method for establishing a communication link with a conference platform running on a remote conference server 108 using data received from a user device 102, according to various embodiments.

At S702, the user 102 may walk into a conference room where a conferencing device 106 is provided. The user 102 may activate (e.g. unlock) the user device 102 through any suitable means including, but not limited to, entering a password, biometric information or an audio command.

At S704, the conferencing device 106 may interact with the user device 102. For example, the conferencing device 106 may ping (e.g. send a signal) to the user device 102 to establish a connection between the user device 102 and the conferencing device 106.

At S706, an application (e.g. the conferencing application 224) on the user device 102 may scan the user device 102 for information associated with one or more conference calls scheduled within a predetermined time period (e.g. all conference call scheduled within 5 minutes, 15 minutes or 1 hour). For example, the conferencing application 224 may identify one or more of a calendar entry, an e-mail, a text message, a document, an image (e.g. a photograph or a screenshot) including details about a conference call.

At S708, the user device 102 may transmit, and the conferencing device 106 may receive information associated with the identified one or more conference calls scheduled within the predetermined time period. For example, the one or more conference calls include a first conference call.

At S710, the conferencing device 106 may parse the information associated with the first conference call, and identify one or more of a telephone number, an internet calling link, an access code, a date, and a time based on parsing.

In some embodiments, the information received from the user device may not be readily parsable. For example, the information may be in form of a document including an image, a screenshot, or a PDF document. In such embodiments, still at S710, the conferencing device may convert the document containing the information associated with the first conference call into machine-encoded text prior to being able to identify the telephone number, the internet calling link, the access code, the date, and/or the time.

At S712, the conferencing device 106 may establish a first communication link with a conference platform running on a remote conference server using information associated with the first conference call such as the one or more of the telephone number, the internet calling link, the access code, the date, and the time. According to various embodiments, establishing the first communication link initiates the first conference call.

Figure 8:
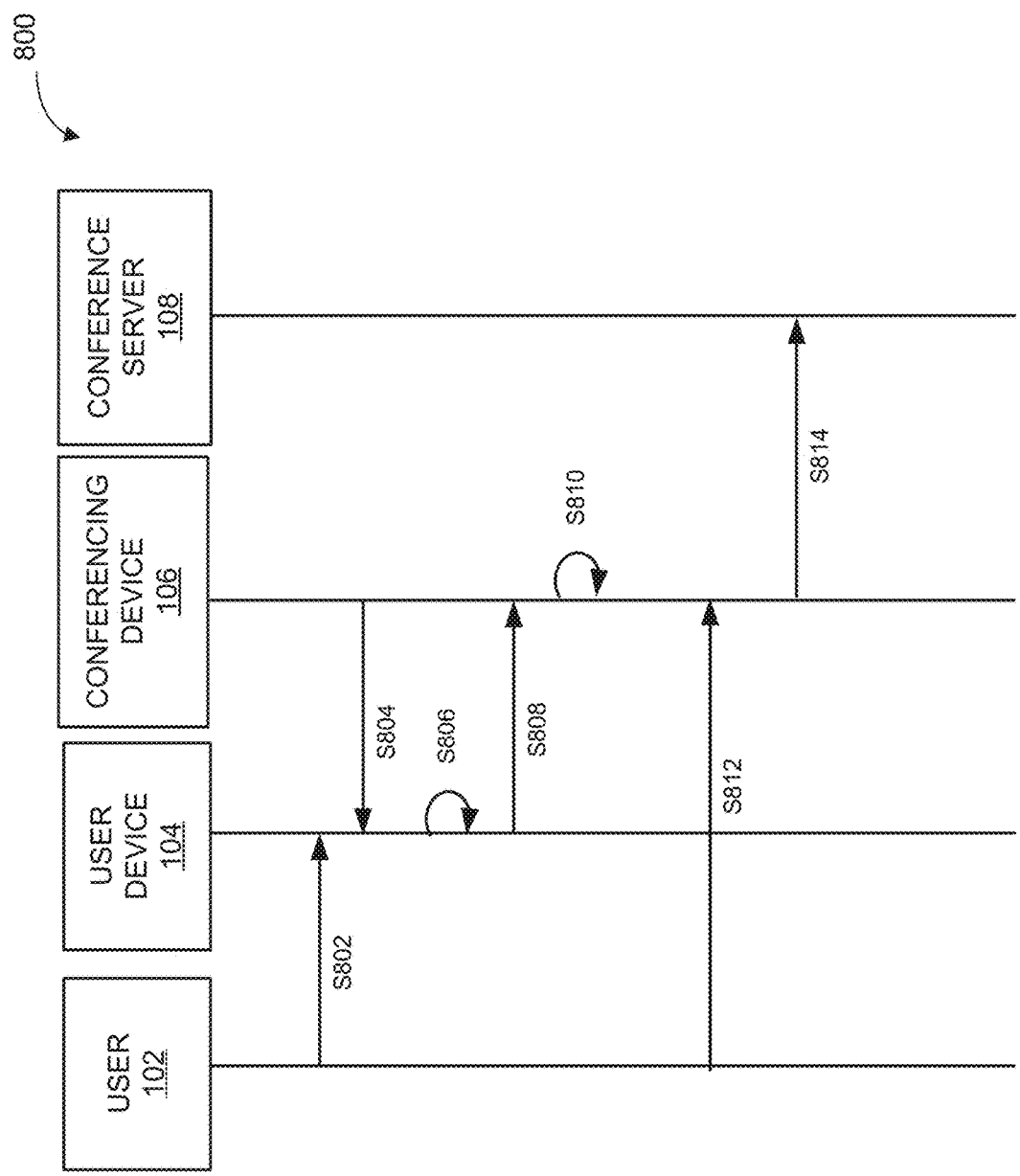
FIG. 8 shows a flowchart illustrating a method for receiving a selection among multiple conference calls, and establishing a communication link for the selected conference call using data received from a user device, according to various embodiments.

According to various embodiments, multiple conference calls may be scheduled at the same time. FIG. 8 shows a flowchart 800 illustrating a method for receiving a selection among multiple conference calls, and establishing a communication link for the selected conference call using data received from a user device, according to various embodiments.

At S802, the user 102 may walk into a conference room where a conferencing device 106 is provided. The user 102 may activate (e.g. unlock) the user device 102 through any suitable means including, but not limited to, entering a password, biometric information or an audio command.

At S804, the conferencing device 106 may interact with the user device 102. For example, the conferencing device 106 may send a ping (e.g. send a signal) to the user device 102 to establish a connection between the user device 102 and the conferencing device 106.

At S806, an application (e.g. the conferencing application 224) on the user device 102 may scan the user device 102 for information associated with at least two conference calls scheduled within a predetermined time period (e.g. all conference calls scheduled within 1 hour, 2 hours, 5 hours). For example, the conferencing application 224 may identify two or more of a calendar entry, an e-mail, a text message, a document, an image (e.g. a photograph or a screenshot), each including details about a conference call. The identified information may be associated with multiple conference calls scheduled at the same time.

At S808, the user device 102 may transmit, and the conferencing device 106 may receive information associated with the identified multiple conference calls scheduled at the same time. For example, the conference calls include a first conference call and a second conference call scheduled at the same time.

At S810, the conferencing device 106 may parse the information associated with the first conference call and the second conference call. The conferencing device 106 may identify, for each one of the first conference call and the second conference call, one or more of a telephone number, an internet calling link, an access code, a date, and a time based on parsing.

In some embodiments, the information received from the user device may not be readily parsable. For example, the information may be in form of a document including an image, a screenshot, or a PDF document. In such embodiments, still at S810, the conferencing device may convert the document containing the information associated with the first conference call and/or the second conference call into machine-encoded text prior to being able to identify the telephone number, the internet calling link, the access code, the date, and/or the time.

Sill referring to S810, the conferencing device 106 may determine that the information retrieved from the user device includes the information associated with the first conference call and information associated with the second conference call scheduled at the same time as the first conference call. The conferencing device 106 may then display a first option for selecting the first conference call and a second option for selecting the second conference call on a display screen of the conferencing device 160.

At S812, the user may select one of the first option or the second option, and the conferencing device 106 may receive the user selection. For example, the conferencing device 106 may receive a user input selecting the first option.

At S814, the conferencing device 106 may establish a first communication link with a conference platform running on a remote conference server using information associated with the first conference call such as the one or more of the telephone number, the internet calling link, the access code, the date, and the time. According to various embodiments, establishing the first communication link initiates the first conference call.

Figure 9:
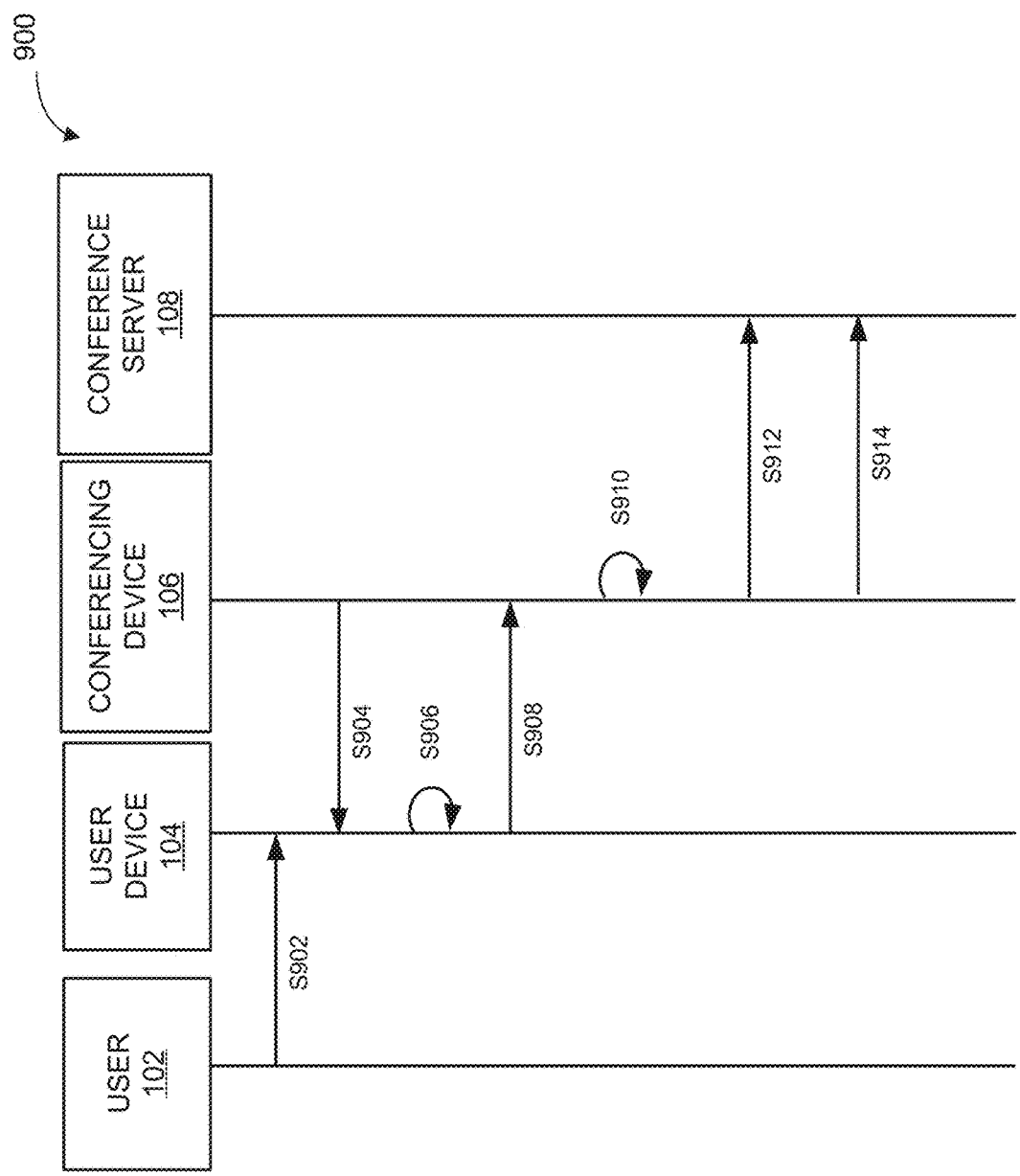
FIG. 9 shows a flowchart illustrating a method for establishing back-to-back communication links with a conference platform running on a remote conference server using data received from a user device, according to various embodiments.

According to various embodiments, the user may have multiple conference calls scheduled one after another within a predetermined amount of time. For example, the user may have a first conference call at 10:00 am, a second conference call at 10:30 am, and a third conference call at 11:30 am. FIG. 9 shows a flowchart 900 illustrating a method for establishing back-to-back (e.g. adjacent in time, or including a time gap between two consecutive conference calls) communication links with a conference platform running on a remote conference server using data received from a user device, according to various embodiments.

At S902, the user 102 may walk into a conference room where a conferencing device 106 is provided. The user 102 may activate (e.g. unlock) the user device 102 through any suitable means including, but not limited to, entering a password, biometric information or an audio command.

At S904, the conferencing device 106 may interact with the user device 102. For example, the conferencing device 106 may ping (e.g. send a signal) to the user device 102 to establish a connection between the user device 102 and the conferencing device 106.

At S906, an application (e.g. the conferencing application 224) on the user device 102 may scan the user device 102 for information associated with multiple conference calls scheduled within a predetermined time period (e.g. all conference calls scheduled within 1 hour, 2 hours, 5 hours). For example, the conferencing application 224 may identify two or more of a calendar entry, an e-mail, a text message, a document, an image (e.g. a photograph or a screenshot) including details about a conference call. The identified information may be associated with multiple conference calls scheduled one after another.

At S908, the user device 102 may transmit, and the conferencing device 106 may receive information associated with the identified multiple conference calls. For example, the conference calls include a first conference call scheduled at a first scheduled time and a second conference call scheduled at a second scheduled time later than the first scheduled time. The predetermined time period includes the first scheduled time and the second scheduled time.

At S910, the conferencing device 106 may parse the information associated with the first conference call and the second conference call. The conferencing device 106 may identify, for each one of the first conference call and the second conference call, one or more of a telephone number, an internet calling link, an access code, a date, and a time based on parsing.

In some embodiments, the information received from the user device may not be readily parsable. For example, the information may be in form of a document including an image, a screenshot, or a PDF document. In such embodiments, still at S910, the conferencing device may convert the document containing the information associated with the first conference call and/or the second conference call into machine-encoded text prior to being able to identify the telephone number, the internet calling link, the access code, the date, and/or the time.

At S912, the conferencing device 106 may establish a first communication link with a conference platform running on a remote conference server when a first current time is equal to the first scheduled time. According to various embodiments, establishing the first communication link initiates the first conference call. When the current time is equal to the second scheduled time, the conferencing device 106 may automatically interrupt or terminate the first conference call.

At S914, the conferencing device 106 may establish a second communication link with the conference platform running on the remote conference server when a second current time is equal to the second scheduled time. According to various embodiments, establishing the second communication link initiates the second conference call. In some embodiments, establishing the second communication link with the conference platform may automatically interrupt the first communication link. In such embodiments, the conferencing device 106 does not need to interact with the user device 102 before each conference call. Rather, the conferencing device 106 may receive information for all conference calls scheduled within a predetermined time frame at once (e.g. during the initial interaction with the user device). According to some embodiments, there may be a time gap (e.g. 5 min, 30 min, 1 hour) between the second scheduled time and the first scheduled time. In other embodiments, the second scheduled time may be immediately after the end time of the first conference call.

Figure 10:
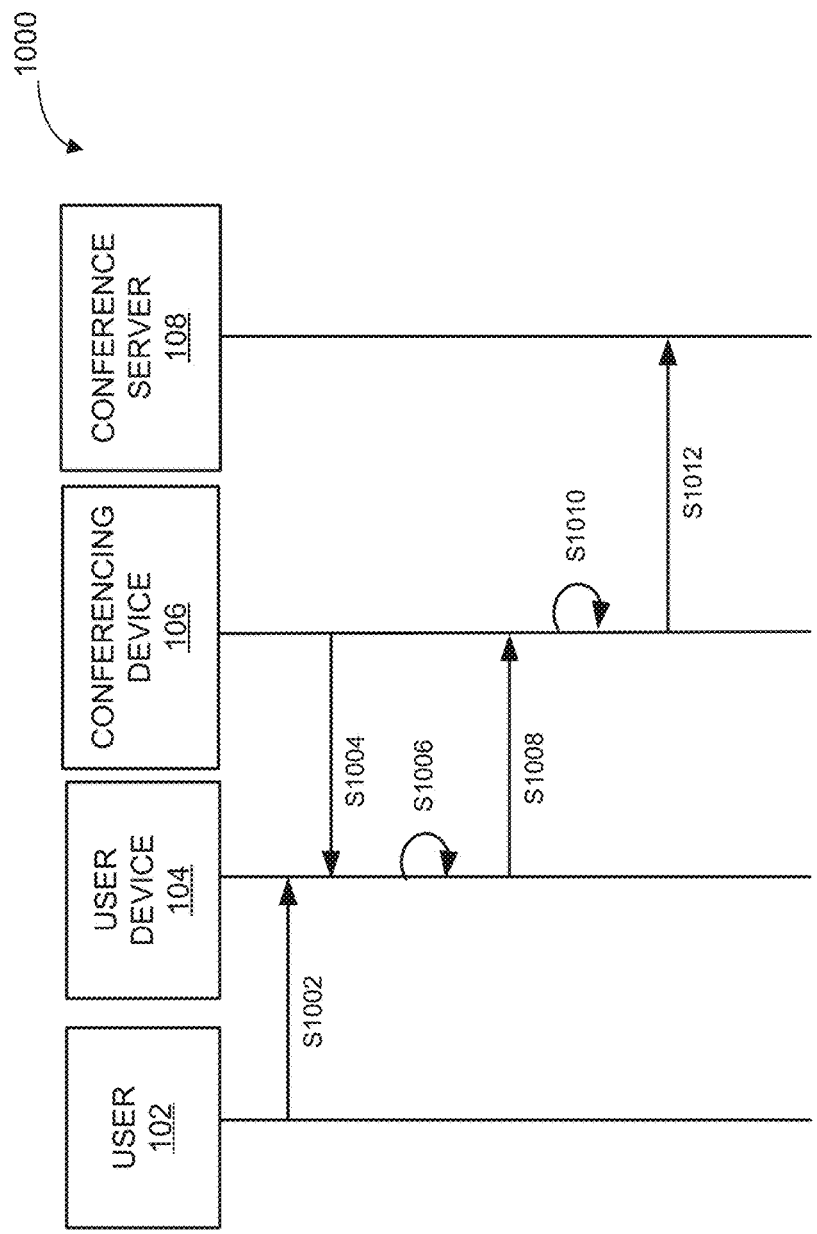
FIG. 10 shows a flowchart illustrating a method for establishing a communication link with a conference platform running on a remote conference server using data received from a barcode on a user device, according to various embodiments.

In some embodiments, the user device 102 may generate a barcode (e.g. QR code) using the identified information associated with one or more conference calls. The conferencing device 106 may scan the barcode displayed on the user device 102 to receive the information from the user device 102. FIG. 10 shows a flowchart 1000 illustrating a method for establishing a communication link with a conference platform running on a remote conference server using data received from a barcode on a user device, according to various embodiments.

At S1002, the user 102 may walk into a conference room where a conferencing device 106 is provided. The user 102 may activate (e.g. unlock) the user device 102 through any suitable means including, but not limited to, entering a password, biometric information or an audio command.

At S1004, the conferencing device 106 may interact with the user device 102. For example, the conferencing device 106 may ping (e.g. send a signal) to the user device 102 to establish a connection between the user device 102 and the conferencing device 106.

At S1006, an application (e.g. the conferencing application 224) on the user device 102 may scan the user device 102 for information associated with one or more conference calls scheduled within a predetermined time period (e.g. all conference call scheduled within 5 minutes, 15 minutes or 1 hour). For example, the conferencing application 224 may identify one or more of a calendar entry, an e-mail, a text message, a document, an image (e.g. a photograph or a screenshot) including details about a conference call.

Still at S1006, a barcode generator on the user device 102 may generate a barcode storing the identified information associated with one or more conference calls scheduled within a predetermined time period.

At S1008, the user device 102 may be placed against a barcode reader of the conferencing device 106 and the conferencing device may read the barcode displayed on the user device 106, thereby receiving the information associated with the identified one or more conference calls scheduled within the predetermined time period. For example, the one or more conference calls include a first conference call.

At S1010, the conferencing device 106 may parse the information associated with the first conference call, and identify one or more of a telephone number, an internet calling link, an access code, a date, and a time based on parsing.

In some embodiments, the information received from the user device may not be readily parsable. For example, the information may be in form of a document including an image, a screenshot, or a PDF document. In such embodiments, still at S1010, the conferencing device may convert the document containing the information associated with the first conference call into machine-encoded text prior to being able to identify the telephone number, the internet calling link, the access code, the date, and/or the time.

At S1012, the conferencing device 106 may establish a first communication link with a conference platform running on a remote conference server using information associated with the first conference call such as the one or more of the telephone number, the internet calling link, the access code, the date, and the time. According to various embodiments, establishing the first communication link initiates the first conference call.

Embodiments of the invention have a number of technical advantages. Embodiments provide a conferencing device that is agnostic of the server storing information associated with conference calls, such as a server storing data associated with a calendar application. Thus, embodiments work in co-working spaces where the conferencing device is agnostic of the company (and the mail/calendar server) of the employee trying to use the conference room. In addition, a user could use a personal calendar (e.g. a calendar that the conferencing device does not have server access to) to initiate a conference call. Embodiments further allow for the conferencing device to retrieve conference call information (e.g. dial-in details) from various sources such as an e-mail message, a text message, a screenshot, or a document in a non-machine readable format.

Embodiments allow a user to connect to a conference call faster than using conventional techniques. For example, in conventional systems, the user takes several steps (1. user takes out the user device, 2. Searches for the call-in details, 3. Dials a telephone number, 4. dials a code for the conference call, 5. Optionally enters a verification PIN, 6. optionally repeats steps 3-5 several times if there's an error or for subsequent calls) for connecting to a conference call. According to embodiments of the invention, the user may not have to take any steps. The conferencing device may automatically communicate with the user device when the user (and the user device) is in close proximity of the conferencing device. In some embodiments, the user may only have to present the user device to the conferencing device. Even for connecting to back-to-back conference calls, the user does not have to perform any steps. Therefore, embodiments are more efficient and more secure than conventional conference call initiation methods.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for initiating conference calls using data stored on a user device, comprising:
    automatically communicating, by a conferencing device, with the user device of a user without an interaction with the user, wherein the interaction initiates a data transmission from the user device to the conferencing device;
    determining, by the conferencing device, that the user device is present at a same location as the conferencing device;
    receiving, by the conferencing device from the user device as part of the data transmission, information associated with one or more conference calls scheduled within a predetermined time period, the one or more conference calls including a first conference call;
    identifying that the information associated with the first conference call includes non-machine-encoded text;
    upon identifying the non-machine-encoded text, converting, by the conferencing device, the information associated with the first conference call into machine-encoded text without a user interaction;
    identifying, by the conferencing device, one or more of a telephone number, an internet calling link, an access code, a date, and a time among the machine-encoded text; and
    establishing, by the conferencing device, a first communication link with a conference platform running on a remote conference server using the one or more of the telephone number, the internet calling link, the access code, the date, and the time, wherein establishing the first communication link initiates the first conference call.

2. The method of claim 1, wherein interacting with the user device includes:
    scanning, by the conferencing device, a barcode storing the information associated with the one or more conference calls within the predetermined time period.

3. The method of claim 1, further comprising, prior to establishing the first communication link with the conference platform:
    determining, by the conferencing device, that the information received from the user device includes the information associated with the first conference call and information associated with a second conference call scheduled at a same time as the first conference call;
    displaying, by the conferencing device, a first option for selecting the first conference call and a second option for selecting the second conference call; and
    receiving, by the conferencing device, an input selecting the first option.

4. The method of claim 1, wherein the one or more conference calls includes the first conference call scheduled at a first scheduled time, and a second conference call scheduled at a second scheduled time later than the first scheduled time, wherein the predetermined time period includes the first scheduled time and the second scheduled time, the method further comprising:
establishing, by the conferencing device, the first communication link with the conference platform using the information associated with the first conference call when a first current time is equal to the first scheduled time; and
establishing, by the conferencing device, a second communication link with the conference platform using information associated with the second conference call when a second current time is equal to the second scheduled time.

5. The method of claim 1, further comprising:
prior to establishing the first communication link with the conference platform:
accessing, by the conferencing device, a database storing a list of conference calls associated with a location assigned to the conferencing device for the predetermined time period;
comparing, by the conferencing device, the information associated with the first conference call with the list of conference calls stored at the database; and
identifying, by the conferencing device, the first conference call among the list of conference calls.

6. The method of claim 1, further comprising:
receiving, by the conferencing device, biometric data of the user;
prior to establishing the first communication link with the conference platform:
accessing, by the conferencing device, a database storing reference information associated with a location assigned to the conferencing device for the predetermined time period;
comparing, by the conferencing device, the biometric data of the user with the reference information stored at the database; and
identifying, by the conferencing device, a first reference information matching the biometric data of the user.

7. The method of claim 1, wherein determining, by the conferencing device, that the user device is present at the same location as the conferencing device further comprises:
receiving, by the conferencing device from the user device, geographic coordinates comprising one or more of a latitude, a longitude, and an elevation position of the user device; and
comparing, by the conferencing device, the geographic coordinates of the user device to geographic coordinates of the conferencing device.

8. A system for initiating conference calls from a user device, comprising:
a conferencing device comprising:
a processor; and
a non-transitory computer readable medium coupled to the processor, the non-transitory computer readable medium comprising code that when executed by the processor of the conferencing device, causes the processor of the conferencing device to:
automatically communicate with the user device of a user without an interaction with the user, wherein the interaction initiates a data transmission from the user device to the conferencing device;
determine that the user device is present at a same location as the conferencing device;
receive, from the user device as part of the data transmission, information associated with one or more conference calls scheduled within a predetermined time period, the one or more conference calls including a first conference call;
identify that the information associated with the first conference call includes non-machine-encoded text;
upon identifying the non-machine-encoded text, convert the information associated with the first conference call into machine-encoded text without a user interaction;
identify one or more of a telephone number, an internet calling link, an access code, a date, and a time among the machine-encoded text; and
establish a first communication link with a conference platform running on a remote conference server using the one or more of the telephone number, the internet calling link, the access code, the date, and the time, wherein establishing the first communication link initiates the first conference call.

9. The system of claim 8, wherein the code further causes the processor of the conferencing device to, prior to establishing the first communication link with the conference platform:
determine that the information received from the user device includes the information associated with the first conference call and information associated with a second conference call scheduled at a same time as the first conference call;
display a first option for selecting the first conference call and a second option for selecting the second conference call, and
receive an input selecting the first option.

10. The system of claim 8, wherein the one or more conference calls includes the first conference call scheduled at a first scheduled time, and a second conference call scheduled at a second scheduled time later than the first scheduled time, wherein the predetermined time period includes the first scheduled time and the second scheduled time,
wherein the code further causes the processor of the conferencing device to:
establish the first communication link with the conference platform using the information associated with the first conference call when a first current time is equal to the first scheduled time; and
establish a second communication link with the conference platform using information associated with the second conference call when a second current time is equal to the second scheduled time.

11. The system of claim 8, wherein the code further causes the processor of the conferencing device to:
scan a barcode storing the information associated with the one or more conference calls within the predetermined time period.

12. The system of claim 8, wherein the code further causes the processor of the conferencing device to, prior to establishing the first communication link with the conference platform:
access a database storing a list of conference calls associated with a location assigned to the conferencing device for the predetermined time period;

compare the information associated with the first conference call with the list of conference calls stored at the database; and identifying, by the conferencing device, the first conference call among the list of conference calls.

13. The system of claim 8, wherein the code further causes the processor of the conferencing device to:

receive biometric data of the user from the user device;

prior to establishing the first communication link with the conference platform:

access a database storing reference information associated with a location assigned to the conferencing device for the predetermined time period;

compare the biometric data of the user with the reference information stored at the database; and identify a first reference information matching the biometric data of the user.

14. The system of claim 8, wherein determining that the user device is present at the same location as the conferencing device further comprises:

receiving, from the user device, geographic coordinates comprising one or more of a latitude, a longitude, and an elevation position of the user device; and comparing the geographic coordinates of the user device to geographic coordinates of the conferencing device.

15. The system of claim 8, further comprising:

the user device comprising:

a processor;

a memory storing a first application configured to communicate with the conferencing device; and a non-transitory computer readable medium coupled to the processor, the non-transitory computer readable medium comprising code that when executed by the processor of the user device, causes the processor of the user device to:

scan, using the first application, the memory for one or more entries associated with the one or more conference calls, wherein each entry stores the information associated with a corresponding conference call;

identify the one or more entries associated with the one or more conference calls; and transmit to the conferencing device, the information associated with the one or more conference calls scheduled within the predetermined time period.

16. The system of claim 15, wherein the memory of the user device stores a calendar application, wherein the one or more entries associated with the one or more conference calls are stored on the calendar application.

\* \* \* \* \*